United States Patent
Mosdale

(10) Patent No.: US 7,314,677 B2
(45) Date of Patent: Jan. 1, 2008

(54) PLANAR FUEL CELL AND METHOD FOR THE PRODUCTION THEREOF

(75) Inventor: Renaut Mosdale, Claix (FR)

(73) Assignee: Commissariat a l'Energie Atomique, Paris (FR)

( * ) Notice: Subject to any disclaimer, the term of this patent is extended or adjusted under 35 U.S.C. 154(b) by 49 days.

(21) Appl. No.: 10/550,080

(22) PCT Filed: Mar. 16, 2004

(86) PCT No.: PCT/FR2004/050109
§ 371 (c)(1),
(2), (4) Date: Sep. 19, 2005

(87) PCT Pub. No.: WO2004/086548
PCT Pub. Date: Oct. 7, 2004

(65) Prior Publication Data
US 2006/0228605 A1    Oct. 12, 2006

(30) Foreign Application Priority Data
Mar. 18, 2003    (FR) ................................. 03 50051

(51) Int. Cl.
*H01M 8/10* (2006.01)
*H01M 2/08* (2006.01)
*H01M 8/08* (2006.01)

(52) U.S. Cl. .............................. 429/30; 429/35; 429/46

(58) Field of Classification Search .................. 429/46, 429/35, 30
See application file for complete search history.

(56) References Cited

U.S. PATENT DOCUMENTS

| 5,863,672 A | 1/1999 | Ledjeff et al. |
| 5,989,741 A | 11/1999 | Bloomfield et al. |
| 2004/0071865 A1 | 4/2004 | Mosdale et al. |

FOREIGN PATENT DOCUMENTS

| EP | 0 482 783 A2 | 4/1992 |
| WO | 01/06586 A1 | 1/2001 |

OTHER PUBLICATIONS

PCT/FR2004/050109, International Preliminary Examination Report (with translation) Mar. 18, 2003, 6 pp.

*Primary Examiner*—Gregg Cantelmo
*Assistant Examiner*—Eugenia Wang
(74) *Attorney, Agent, or Firm*—Thelen Reid Brown Raysman & Steiner LLP

(57) ABSTRACT

A planar fuel cell comprising an electrode-membrane-electrode assembly, wherein the membrane includes a fabric having a warp fibers which are continuous insulating fibers of an electrically insulating material and weft fibers comprising of both fibers of the insulating material and fibers of an electrically conducting material in an alternating fashion, so as to form insulating areas and conducting areas, respectively.

13 Claims, 3 Drawing Sheets

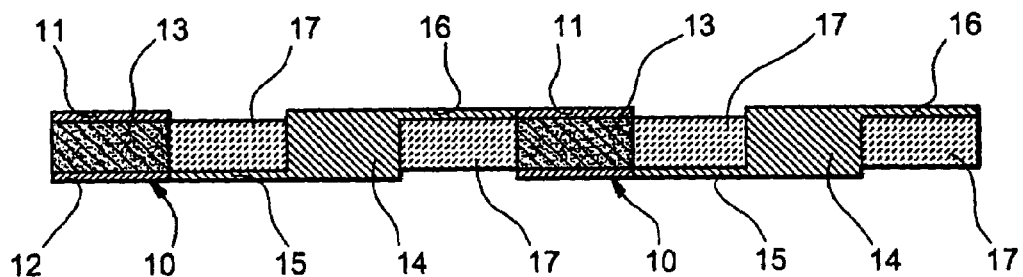
(PRIOR ART) FIG. 1
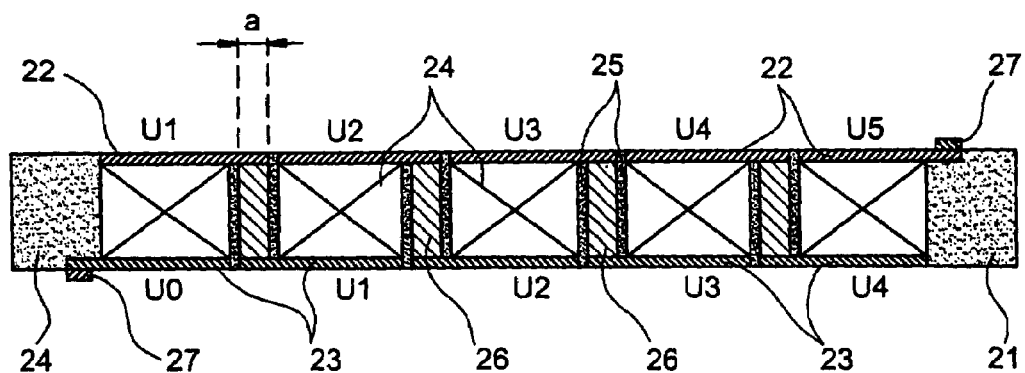
(PRIOR ART) FIG. 2
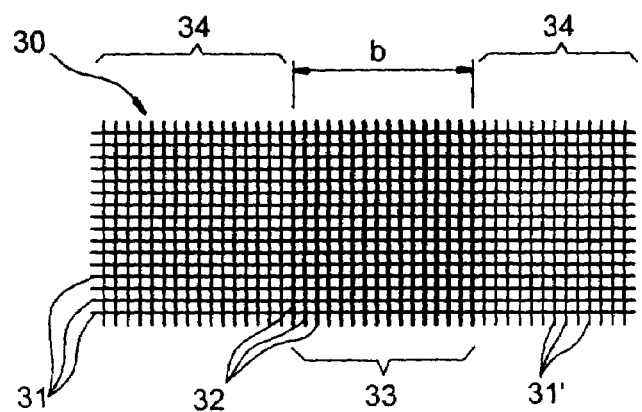
FIG. 3

PLANAR FUEL CELL AND METHOD FOR THE PRODUCTION THEREOF

CROSS-REFERENCE TO RELATED APPLICATION

This application claims priority based on International Patent Application No. PCT/FR2004/050109, entitled "Planar Fuel Cell and Method for the Production Thereof" by Renaut Mosdale, which claims priority of French Application No. 03 50051, filed on Mar. 18, 2003, and which was not published in English.

TECHNICAL FIELD

The invention relates to a planar fuel cell and to the method for making such a cell.

The field of the invention is that of planar fuel cells, for example with a solid polymer electrolyte, and of their application to generating electrical powers from a few hundreds of milliwatts to a few hundreds of kilowatts, for stationary applications, for example, for power stations or boilers, applications to transportations, for example for land, sea, or air-borne vehicles, and portable or transportable applications for example, for portable telephones or computers.

STATE OF THE PRIOR ART

At the present time, most fuel cells are built on the basis of a sandwich assembly consisting of two electrodes positioned on either side of an electrolyte. These electrodes generally consist of a diffusion layer on which an active layer is deposited (catalyst layer). A different reagent arrives on each external surface of both electrodes, i.e., a fuel and an oxidizer. The latter chemically react via the electrolytic component so that it is possible to pick up an electrical voltage at the terminals of both electrodes.

If the fuel is hydrogen, and the oxidizer oxygen, oxidation of hydrogen takes place at the anode, whereas reduction of oxygen into water occurs at the cathode.

Each electrode is therefore the centre of an electrochemical reaction, the resulting voltage, the potential difference between both of these reactions, is generally about 1 volt (with zero current) as oxidation of hydrogen into protons is achieved at the anode and reduction of oxygen into water is achieved at the cathode. This low voltage is the main handicap of such cells relatively to standard batteries, for which the elementary voltage may rise up to 4 volts (for example the Li/C pair). To find a remedy to this problem, a large number of such components are usually stacked according to a so-called filter press technology. But this technology has a problem of poor distribution of the gases in each cell and of leaking in the stack, worsened by the multiplication of the number of stacked components. Moreover, the bipolar plates separating two elementary cells must meet the following specific physical and chemical criteria:

very good electronic conductivity, impermeability to gases, low mass, chemical resistance to water, oxygen and hydrogen, low cost material, good machinability.

No bipolar plate technology meets such criteria today, which requires the use of an expensive machining technique, or the use of very costly materials. Moreover, this type of stacking is generally of a parallelepipedeous geometry unpropitious to integration.

In order to overcome such drawbacks, a geometry for a fuel cell with which several pairs of electrodes may be associated on a same membrane and the elementary voltage may be increased artificially. This association is achieved by stacking materials shifted relatively to each other. It requires the use of electronically insulating gas distribution plates.

As illustrated in FIG. 1, such a fuel cell consists of an assembly of several individual cells 10, positioned either near or behind each other, each comprising an anode 11 and a cathode 12, tightly enclosing an electrolytic layer 13. These individual cells 10 are separated from each other by insulating areas 17, and are connected with each other by conducting parts 14, a first end 15 of a conducting part 14 being connected to the cathode 12 of a first stack 10, and a second end 16 of this conduction part 14 being connected to the anode of another cell 10 which is adjacent to it.

Such an assembly is difficult to produce, not only for making different individual cells 10 at a small scale, but also for making their electrical connection. Moreover, leak-tightness problems continue to exist.

To find a remedy to these drawbacks, the a prior art method is disclosed for making an assembly of basic fuel cell components by forming several elementary cells, by depositing on an insulating weft, in several successive steps, different components as suspensions.

FIG. 2 illustrates such an assembly of basic components, once finished. All the functional components of this assembly are parts deposited one after the other on and/or in a weft material plate, the thickness of which corresponds to the thickness of an ion-conducting layer. First of all, this assembly comprises a peripheral gasket 21, placed over the whole thickness of the plate at the periphery of the latter. This peripheral gasket 21 is in a chemically inert and electronically and ionically insulating material. These different elementary cells of this assembly each consist of an anode 22 placed on a first surface of the plate, a cathode 23 placed on the opposite surface of the plate and a ion conductor 24 located between the anode 22 and the cathode 23, over the whole thickness of the plate. The anode 22 protrudes on one side of the ion conductor 24 and the cathode 23 protrudes from the ion conductor 24 on the opposite side to the anode. In this way, each protruding portion of an anode 22 and of a cathode 23 is found facing, within the thickness of the plate, a cathode 23 or an anode 22 of a neighboring cell, except for the anode 22 of a first end cell and the cathode 23 of the other end cell. An electron conductor 26, deposited over the whole thickness of the plate, enables the anode 22 of a cell of rank n to be connected to the cathode 23 of the neighboring cell of rank n+1, which is placed facing the latter, the voltage Ui (0<i<5) of the one being transferred to the other. Vertical insulating layers 25 separate each electron conductor 26 from both portions of the ion conductor 24 which are adjacent to it. The distance a between both neighboring vertical insulating layers 25 may be of the order of 5 millimeters. A first electron collector 27 is placed on the anode 22 protruding from a first end cell and a second collector 27 is placed on the cathode 23 protruding from the other end cell.

The major problems encountered in elaborating this type of planar fuel cell are the leak-tightness of the ion conductor/electron conductor material interfaces on the one hand, and the low values of electron conductivity obtained in the <<current crossings>> on the other hand. These low conductivity values cause high ohmic drops inducing losses of performances and heating of these crossings (Joule effect).

The object of the invention is to solve such problems.

DISCUSSION OF THE INVENTION

The invention relates to a planar fuel cell including an electrode-membrane-electrode assembly, characterized in that the membrane includes a fabric, the warp fibers of which are continuous fibers in an electrically insulating material and the weft fibers alternately are fibers in insulating material and fibers in an electrically conducting material, so as to form insulating areas and conducting areas, respectively.

Advantageously, the fibers in insulating material may be a polymer or an inert glass. The fibers in the electrically conducting material may be carbon fibers or stainless steel fibers.

Such a cell notably has the following advantages:

a simplification in the making by suppressing the step for depositing vertical insulating layers, an increase in performance by providing a massive electron conductor in the electrical crossings, a size of electron conductors allowing the number of pairs of electrodes to be increased on a same surface, thereby increasing the voltage of the cell.

The invention also relates to a method for making a planar fuel cell, which comprises the following steps:

cutting out, with the desired shape, of a piece of material, depositing a seal layer over the whole thickness of the peripheral layer of this piece of material with a slight excess thickness, depositing a ion conductor over the whole thickness of this piece of material, depositing anodes on a first surface of the thereby filled piece of material and cathodes on the other surface of the latter, depositing electron collectors at one of the two ends of the assembly of anodes and at the other end of the assembly of cathodes, characterized in that the piece of material is a piece of fabric, the warp fibers of which are continuous fibers in an electrically insulating material and the weft fibers alternately are fibers in insulating material and fibers in electrically conducting material to form insulating areas and conducting areas, respectively.

Advantageously, an insulating gasket is deposited on either side of each conducting area.

Because of the woven structure of this piece of fabric, the fibers are in intimate electrical contact, unlike the devices of the known art where conducting grains are embedded in a binder and where electrical continuity is not absolute. This piece of fabric therefore causes an increase in conductivity by a factor 2 to 10 so that the performances of the cell may be improved and the size of the insulating areas and therefore those of the cells may be reduced.

The applications aimed by such a type of (monoblock or polycomponent) fuel cell technology are light and portable systems, requiring electrical voltage supplies larger than 1 volt, and in which problems of weight and shapes are posed.

The fuel feeding a thereby built cell may be stored as compressed gas on the outside of the cell or else in an adsorbed form in hydrides, which may be made as hydride sheets in contact with the anodes.

BRIEF DESCRIPTION OF THE DRAWINGS

FIG. 1 illustrates a first device of the known art.

FIG. 2 illustrates a second device of the known art.

FIG. 3 illustrates a locally conducting weft according to the invention.

DETAILED DISCUSSION OF PARTICULAR EMBODIMENTS

Figure 4A:
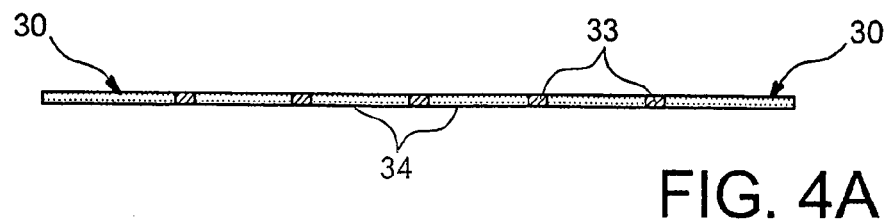
FIGS. 4 to 6 respectively illustrate the steps of the method of the invention both in a transverse sectional view (FIGS. 4A, 5A and 6A) and in a top view (FIGS. 4B, 5B and 6B).

In making juxtaposed planar cells of the known art, as illustrated in FIG. 2, a porous matrix is used which is locally filled with a suitable material for the functions which the filled area should perform. Such a solution has leak-tightness problems at the interfaces of the different areas. Moreover, the electronic conductivity is not necessarily high because of the actual structure of the porous material.

To overcome such drawbacks, the invention consists of using, instead of the porous matrix, a fabric 30 of fibers in one piece. As illustrated in FIG. 3, the warp fibers 31 are continuous from one end to the other of the cell (there is no interface, therefore no loss of space) and are in an electrically insulating material. The weft fibers are made with insulating fibers 31' or conducting fibers 32 alternately so as to achieve the different functions of a cell component and to juxtapose the components in order to form a cell.

The insulating fibers 31 and 31' for example are polymer or chemically inert glass fibers. The conducting fibers 32 for example are carbon or stainless steel fibers.

These conducting fibers 32 form, as illustrated in FIG. 3, conducting areas 33 in order to locally provide over a width b, an electronic conductivity in the thickness of the weft. This width b may be of the order of 2 millimeters, for a fabric surface area of about 1 square meter, and a thickness between 20 micrometers and 100 micrometers.

As illustrated in FIG. 3, this fabric 30 may be made with a standard web woven at right angles. The number of fibers and the weaving angle may vary depending on the selected geometry for the cell.

The method for making such a planar fuel cell comprises the following steps:

cutting out, with the desired shape, the piece of fabric 30 which includes insulating areas 34 separated by conducting areas 33, depositing a seal layer 40 over the whole thickness of the periphery of this piece of fabric 30 in a slight over thickness, depositing a ion conductor 41 over the whole thickness of this piece of fabric 30 depositing the anodes 44 on a first surface of the thereby filled piece of fabric and the cathodes 45 on the other surface, depositing (not illustrated in FIGS. 4-6) electron collectors at one of the two ends of the assembly of anodes 44 and at the other end of the assembly of cathodes 45.

The different deposition steps provided above are advantageously achieved by means of masks.

In order to improve operation, by avoiding any ionic leak, it is possible to deposit insulating gaskets on either side of each conducting area 33.

Figure 4B:
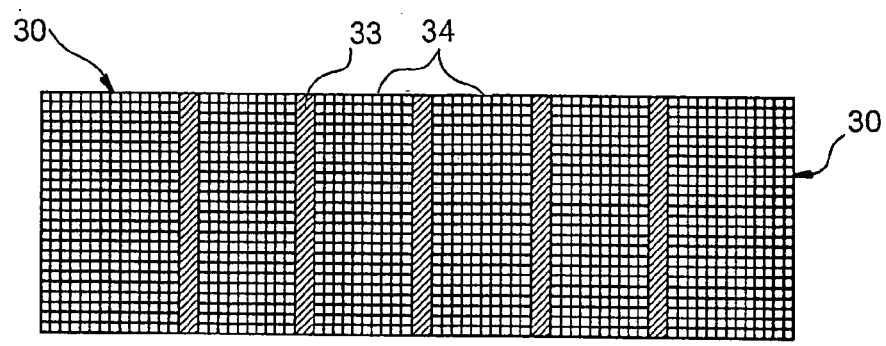
Figure 5A:
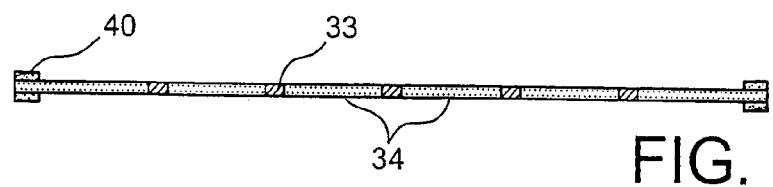
Figure 5B:
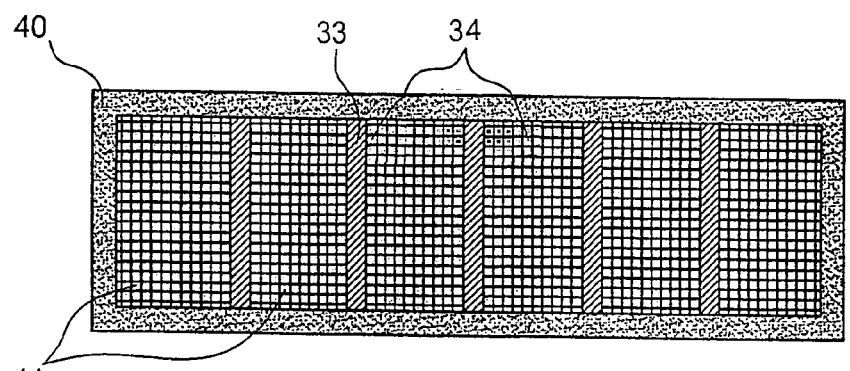
Figure 6A:
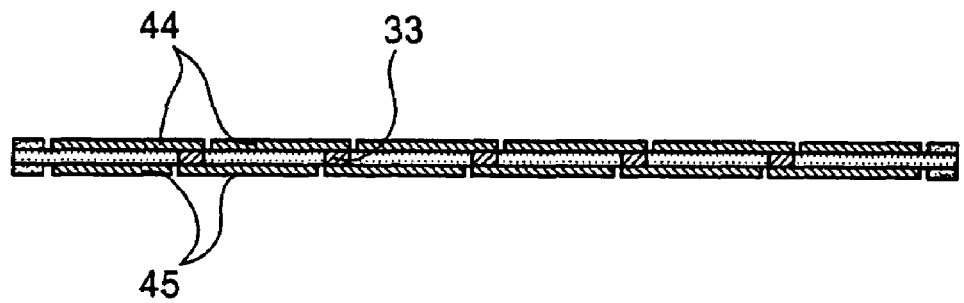
Figure 6B:
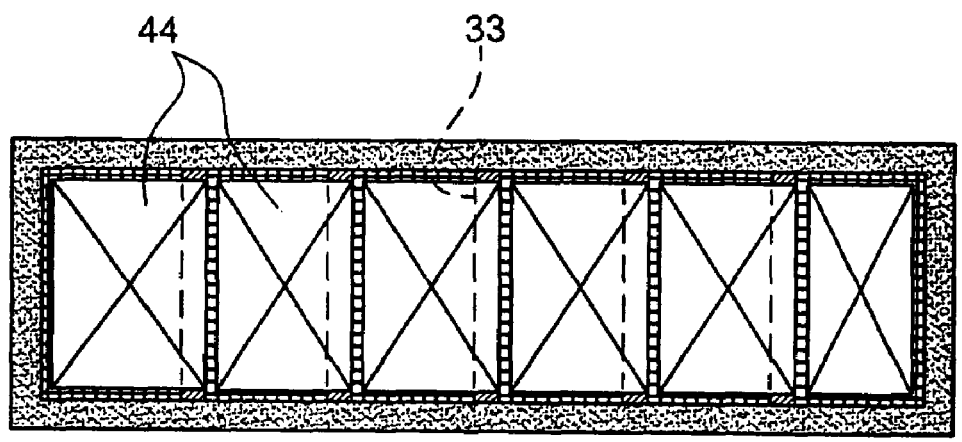

Thus, according to these steps illustrated in FIGS. 4-6, it is possible to make planar fuel cells having performances superior to those obtained with the cells described in the prior art, and reinforced mechanical strength by suppressing a ion conductor/electron conductor interface, also limiting the risks of internal leaks which may cause hydrogen/oxygen mixtures.

The cell structure of the invention as shown above is only an example. The invention may be applied to microcells for example die-stamped on a support or to all cells which have on a same plane, separate electrically conducting surfaces and ion conducting surfaces.

The invention claimed is:

1. A planar fuel cell comprising: an electrode-membrane-electrode assembly, wherein the membrane includes a fabric having a warp fibers which are continuous insulating fibers of an electrically insulating material and weft fibers comprising of both fibers of the insulating material and fibers of an electrically conducting material in an alternating fashion, so as to form insulating areas and conducting areas, respectively.

2. The fuel cell according to claim 1, wherein the fibers in the insulating material are a polymer or an inert glass.

3. The fuel cell according to claim 1, wherein in the fibers in electrically conducting material are carbon fibers or stainless steel fibers.

4. The fuel cell according to claim 1, further comprising insulating gaskets disposed between the conducting areas and the insulating areas.

5. The fuel cell according to claim 1, further comprising a seal layer disposed around a periphery of the fabric, wherein the seal layer has a thickness larger than a thickness of the fabric.

6. The fuel cell according to claim 1, further comprising an anode disposed on a first side of the fabric and a cathode disposed on a second side of the fabric opposite to the first side.

7. The fuel cell according to claim 1, further comprising an ion conductor disposed over the fabric.

8. A planar fuel cell including a fabric, the fabric comprising:
a plurality of insulating warp fibers oriented in a first direction, the insulating warp fibers being made of an electrically insulating material; and
a plurality of weft fibers in the fabric and oriented in a second direction substantially perpendicular to the warp fibers, the weft fibers being made of an electrically conducting material in a first conducting area, the weft fibers being made of an electrically insulating material in a first insulating area, wherein the first conducting area and the first insulating area are adjacent to one another in the fabric.

9. The fuel cell according to claim 8, further comprising the weft fibers being made of the electrically insulating area in a second insulating area located adjacent to the first conducting area and on an opposite side of the first conducting area from the first insulating area.

10. The fuel cell according to claim 8, further comprising insulating gaskets disposed between the first conducting area and the first insulating area.

11. The fuel cell according to claim 8, further comprising a seal layer disposed around a periphery of the fabric, wherein the seal layer has a thickness larger than a thickness of the fabric.

12. The fuel cell according to claim 8, further comprising an anode disposed on a first side of the fabric and a cathode disposed on a second side of the fabric opposite to the first side.

13. The fuel cell according to claim 8, further comprising an ion conductor disposed over the fabric.

* * * * *